Patented Sept. 30, 1947

2,428,130

UNITED STATES PATENT OFFICE 2,428,130

TRIS AND POLYAZO DYES FROM TETRAZOTIZED 0:0' DIHYDROXYBENZIDINE

Fritz Straub, Kaiseraugst, and Jakob Brassel and Peter Pieth, Basel, Switzerland, assignors to the Swiss firm of Society of Chemical Industry in Basle, Basel, Switzerland No Drawing. Application February 26, 1942, Serial No. 432,516. In Switzerland February 18, 1941

10 Claims. (Cl. 260—168)

The present invention is concerned with valuable new tris- and poly-azo-dyestuffs, and a process for preparing the same. The present invention is particularly concerned with direct dyeing cotton dyestuffs (also called substantive dyestuffs), and still more particularly with dyestuffs capable of being metallized, for instance coppered, in substance, in the dyebath or on the fiber, as the case may be.

According to the present invention use is made in the manufacture of such dyestuffs of tetrazotized 3:3'- dihydroxy - 4:4' - diaminodiphenyl, which is coupled with two molecular proportions of coupling components as defined hereinafter.

3:3'- dihydroxy-4:4'-diaminodiphenyl, which is a known compound and which may be obtained for instance by saponifying dianisidine by means of aluminum chloride, has not hitherto found any industrial use. Although a few disazo-dyestuffs prepared with tetrazotized 3:3'- dihydroxybenzidine have been described in the literature, the said compound has generally been regarded to be of no practical value. This is probably due to several facts. First of all it was generally believed that the said product would be too expensive for the commercial manufacture of dyestuffs. Furthermore, the very few dyestuffs hitherto prepared with the said tetrazo compound did not show properties which might make them compete successfully with other dyestuffs, and it is to be remarked that, according to the prescriptions found in the literature, correct coupling is in most cases not brought about, which obviously does not lead to correct disazo dyestuffs.

According to the present invention it has been found that the cost of 3:3'-dihydroxy-4:4'-diaminodiphenyl is by no means prohibitive for the manufacture of dyestuffs therefrom, since such dyestuffs as hereinafter defined show very valuable properties which more than outweigh any difficulties encountered in preparing the said starting material. Further, it will be shown hereinafter that correct coupling on both sides can be brought about, and that dyestuffs of much superior properties can be produced thereby.

According to one feature of the present invention a tetrazotized 3:3'-dihydroxy-4:4'-diaminodiphenyl is coupled with two molecular proportions of coupling components, at least one of which is an azo-dyestuff capable of coupling.

3:3'-dihydroxy-4:4'-diaminodiphenyl may be obtained by saponification of dianisidine by means of aluminum chloride and may be purified if necessary according to known methods. It may be tetrazotized in known manner and the tetrazo compound may be used immediately after tetrazotizing or may be separated, as described in the examples below.

Coupling components which contain azo-groups may be obtained for example by coupling diazo-compounds which may themselves contain azo-groups with coupling components capable of coupling twice. These coupling components may belong to the naphthalene or benzene series and may contain two auxochromic groups such as hydroxyl or amino groups in the same nucleus or in different nuclei. Coupling components of this kind are for example resorcinol, naphtho-resorcinol, 1:8-dihydroxynaphthalene and its mono- and disulfonic acids, 1-amino-8-hydroxynaphthalene and its mono- and disulfonic acids, 2-amino-5- or 8-hydroxynaphthalene and its sulfonic acids, such as 2-amino-5-hydroxy-7-sulfonic acid. Further coupling components are to be mentioned which consist of more than one radical containing an auxochrome group which determines coupling, inter-connected by a bridge which may be of any suitable kind. Such components are, for example, 5:5'-dihydroxy-2:2'-dinaphthylamine-7:7'-disulfonic acid and its isomers, the urea of 2-amino-5-hydroxynaphthalene-7-sulfonic acid and its isomers, further components in which coupling may occur both in a heterocyclic and in an isocyclic nucleus, such as 1-aryl-5-pyrazolones, wherein the aryl nucleus contains at least one auxochromic group which determines coupling, and the pyrazolone nucleus may contain a methyl or carboxyl group, e. g., in 3-position. Further coupling components of the triazine series come into consideration.

These coupling components may be combined with any diazo or diazoazo-components for example belonging to the benzene, naphthalene, carbazole, dehydrothio-toluidine and diphenyl series in such a manner that they are still capable of coupling further. In many instances it is of advantage to use diazo components which contain a group or grouping capable of fixing metals in complex union, such as a hydroxyl carboxyl group or a functional derivative thereof in ortho-position to the diazo-group or a salicylic acid grouping.

Coupling components which contain at least one azo-group may further be obtained by other processes known in the art, such as by reductive linkage of nitro groups, etc.

If according to the present invention a tetrazotized 3:3'-dihydroxy-4:4'-diaminodiphenyl is coupled with such coupling components containing azo-groups, two molecular proportions of the same coupling component may be used or of different components in which instance the remaining may be any coupling component of the benzene, naphthalene, carbazole, heterocyclic or open-chain series.

In many instances, according to another feature of the present invention, it may be more convenient first to couple a tetrazotized 3:3'-dihydroxy-4:4'-diaminodiphenyl with two molecular proportions of coupling components at least one of which is capable of coupling twice as defined above and afterwards to couple the said disazo-dyestuff still capable of coupling with suitable diazo components as defined above.

If any such dyestuff contains an amino group capable of being diazotized, such dyestuff may be converted into the corresponding diazoazo-compound and coupled with suitable coupling components.

In any of the processes described above, use may be made of so-called middle components, for example these arylamines capable of coupling in para-position to an amino group, such as aniline and its nuclear substitution products capable of coupling, if desired in the form of ω-methane sulfonic acid, 1-aminonaphthalene and its 6- and 7-sulfonic acids, as well as its 2-methoxy or 2-ethoxy substitution products, etc.

In all the instances mentioned above coupling with a tetrazotized 3:3'-dihydroxy-4:4'-diaminodiphenyl is effected with advantage in an alkaline medium. It is to be remarked, however, that there are many coupling components, especially those of the naphthalene series, which do not combine in a satisfactory manner with tetrazotized 3:3'-dihydroxy-4:4'-diaminodiphenyl when coupling occurs in the usual manner, i. e., in a medium alkaline with sodium carbonate, even if pyridine or similar promoters are added. It is a further feature of the present invention that in all instances where combination is slow and/or incomplete with the usual coupling methods, coupling is effected in a medium alkaline with a hydroxide of the alkaline or alkaline earth metal series including ammonia. It is often desirable to use strongly caustic alkaline media, for instance strong solutions of caustic potash or soda, but, in other instances, the hydroxides of calcium, barium, strontium or magnesium are suitable too, whereas media substantially free from carbonate generally appear to be desirable whenever combination is difficult.

The tris- and poly-azo-dyestuffs of the present invention are suitable for dyeing and printing the most diverse materials, especially cellulose fibers, such as cotton and other vegetable fibers, rayon from regenerated cellulose including staple fibers, and also for dyeing and printing animal fibers such as wool, silk and leather. Due to the fact that the said dyestuffs are derived from an ortho-hydroxydiazo compound they are capable of forming complex metal compounds, for instance, with the metals copper, cobalt, nickel, iron, chromium, vanadium, manganese.

Many of the foregoing dyestuffs yield very valuable complex metal compounds if treated in substance with agents yielding metal. This is especially true of those dyestuffs which contain more than two sulfonic acid groups, for instance those derived from two coupling components belonging to the group of hydroxynaphthalene disulfonic acid coupling components. With other dyestuffs it may be more advantageous to effect metallization during or, still better, after dyeing according to the known aftertreating methods. With special advantage use may be made of the dyeing methods described in U. S. Patents 2,148,659 and 2,185,905, whereby metallizing is preferably carried out with agents yielding metal which are stable towards alkalies, for instance complex tartrates of copper or other metals.

In some cases it may also be useful to treat some dyestuffs as mentioned above in substance with such alkaline metallizing agents.

Furthermore it is possible to make use of complex metal compounds of the dyestuffs according to the present invention for coloring masses, varnishes, lacquers, resins, both artificial and natural, and spinning solutions.

Whether it is preferable to produce the aforementioned complex metal compounds on the fiber or in substance depends on various properties thereof, inter alia, whether the complex metal compounds are soluble, whether the metal-free dyestuffs possess sufficient affinity for the fiber to be dyed, etc.

The following examples illustrate the invention, the parts being by weight unless otherwise stated:

*Example 1*

21.6 parts of 3:3'-dihydroxy-4:4'-diaminodiphenyl, in the form of its dichlorhydrate, are stirred in 100 parts of water and 12 parts of concentrated hydrochloric acid and is tetrazotized by addition of an aqueous solution of 13.8 parts of sodium nitrite at 5–8° C. When tetrazotization is complete, the suspension is cooled to 3° C., neutralized by addition of 6.4 parts of soda and filtered to obtain the precipitated tetrazo compound.

103 parts of the disodium salt of 5:5'-dihydroxy-2:2'-dinaphthylamine-7:7'-disulfonic acid are dissolved in 130 parts of water and 30 parts of potassium hydroxide. The solution is cooled to 5° C., and the above tetrazo compound is added to it whilst stirring thoroughly. Coupling is carried out for 2 hours at 5–8° C. and 24 hours at 10–15° C. Finally, the coupling temperature is raised to 20–30° C. When coupling is complete, the mass is diluted with 1000 parts of water, 65 parts of sodium chloride are added at 55° C. and the dyestuff is precipitated by addition of 200 parts by volume of hydrochloric acid of 5 per cent strength. The diazo dyestuff is purified by dissolving it in 2000 parts of water and 10.6 parts of soda and salting out.

This disazo dyestuff is dissolved in 1500 parts of water and 26.5 parts of soda, the solution is cooled to 10° C. and coupled at 10–15° C. with the diazo compound obtained in the usual way from 37.6 parts of 1-hydroxy-2-aminobenzene-4-sulfamide. When the reaction is finished, most of the new tetrakisazo-dyestuff is precipitated. It is filtered and again purified by dissolving and salting out. It possesses the formula and when dry is a greyish-black powder which dissolves in water with violet, in a 10 per cent. soda solution with reddish blue, in 10 per cent. caustic soda solution with reddish violet and in concentrated sulfuric acid with blue color. It dyes cotton on coppering according to a one or two bath after-coppering process fast blue shades.

Dyestuffs producing similar blue shades are obtained if instead of diazotized 1-hydroxy-2-aminobenzene - 4 - sulfamide, diazotized 1-hydroxy - 2 - amino-4-chlorobenzene, 1-hydroxy-2-amino-4:6-dinitrobenzene or 1-amino-2-carboxy-4-nitrobenzene is used.

An especially valuable dyestuff is obtained if diazotized 5-nitro-2-amino-1-hydroxybenzene is used instead of diazotized 2-amino-1-hydroxybenzene-4-sulfamide.

*Example 2*

12 parts of the dyestuff from diazotized 4-amino-1-hydroxybenzene-2-carboxylic acid and 1-amino-2-methoxy-5-methylbenzene (acid coupling) are diazotized as usual and combined with a solution of 23.2 parts of the dyestuff from tetrazotized 3:3' - dihydroxy - 4:4' - diaminodiphenyl and two molecular proportions of 5:5'-dihydroxy-2:2' - dinaphthylamine-7:7'-disulfonic acid (see second paragraph of Example 1) in 500 parts of water and 20 parts of soda. After stirring for 24 hours at 15–18° C. the reaction is complete and the dyestuff which has separated out is filtered. The dyestuff of the formula

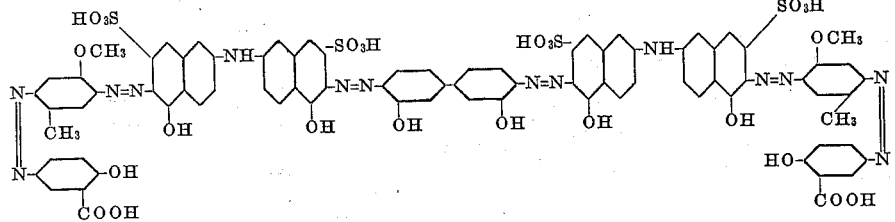

dyes cotton on after-coppering in the dyebath with a complex copper tartrate solution alkaline with soda fast blue shades.

*Example 3*

If in the second paragraph of Example 1 the 5:5' - dihydroxy - 2:2'-dinaphthylamine-7:7'-disulfonic acid is replaced by an equivalent amount of the urea from 2-amino-5-hydroxynaphthalene-7-sulfonic acid of the formula

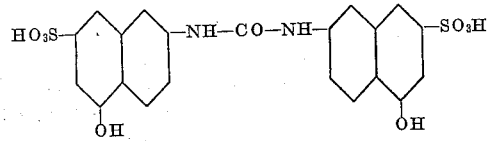

a dyestuff is obtained which yields violet shades on after-treatment with a complex copper tartrate solution alkaline with soda.

*Example 4*

A tetrazo solution obtained by adding 2.76 parts of sodium nitrite (dissolved in a little water) to a mixture of 4.32 parts of 3:3'-dihydroxy-4:4'-diaminodiphenyl, 10 parts by volume of 30 per cent. hydrochloric acid and 200 parts of water, is coupled with a solution of 3.5 parts of 1-phenyl-3-methyl-5-pyrazolone in 8 parts by volume of 30 per cent. caustic soda, 10 parts of anhydrous sodium carbonate and 100 parts of water. After stirring for 2 hours at 18–20° C. the diazoazo-compound is filtered off. It is stirred into 50 parts of water and thereto is added a solution of 2.2 parts of resorcinol and 5 parts of anhydrous sodium carbonate in 20 parts of water. Coupling is conducted whilst stirring for one hour at 18° C. and completed by addition of 10 parts by volume of 30 per cent. caustic soda solution and further stirring for one hour. The disazo-dyestuff is precipitated by addition of hydrochloric acid and common salt and filtered off. The filter cake is dissolved in 150 parts of water and 15 parts by volume of caustic soda solution of 30 per cent. strength and combined with a diazo solution prepared as usual from 4.36 parts of 4-nitro-1-aminobenzene-2-sulfonic acid by stirring for 24 hours at 15–18° C. The resulting dyestuff is precipitated by addition of common salt and possesses the formula

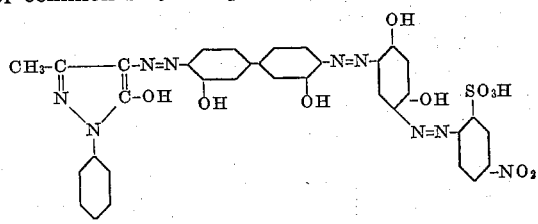

It dyes cotton on after-treatment with complex copper tartrate brownish Bordeaux shades of good fastness.

*Example 5*

A tetrazo solution prepared from 4.32 parts of 3:3'-dihydroxy-4:4'-diamino-diphenyl, 10 parts 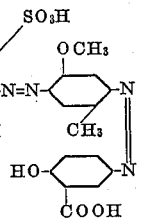 by volume of 30 per cent. hydrochloric acid and 200 parts of water by addition of 2.76 parts of sodium nitrite is coupled with a solution of 12.8 parts of 1-(5'-hydroxy-7'-sulfo-naphthyl-2'-)-3-methyl-5-pyrazolone and 15 parts of anhydrous sodium carbonate in 200 parts of water, by stirring 24 hours at 12–15° C. and further 24 hours after addition of 20 parts by volume of 30 per cent. caustic soda solution at room temperature. Under these conditions coupling occurs in the pyrazolone ring. On addition of 20 parts by volume of 30 per cent. hydrochloric acid the dyestuff is precipitated and suction-filtered. This disazo-dyestuff is dissolved in 200 parts of water with addition of 10 parts of soda and coupled with the diazo solution obtained in the usual manner from 5.48 parts of anthranilic acid at 5–10° C. After 24 hours' stirring whilst allowing the temperature to rise to about 18° C. the dyestuff is precipitated by addition of common salt. It corresponds to the formula

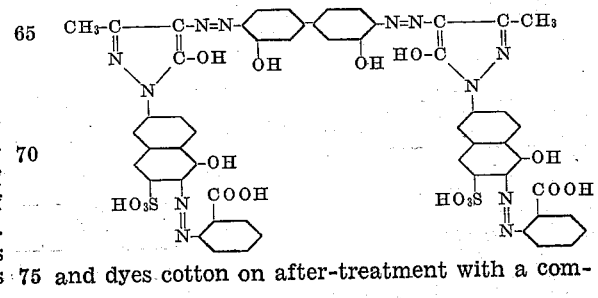

and dyes cotton on after-treatment with a complex copper tartrate solution very fast brownish Bordeaux shades.

Example 6

A tetrazo solution from 4.32 parts of 3:3'-dihydroxy-4:4'-diaminodiphenyl prepared as described in the previous example is coupled with a solution of 4.5 parts of resorcinol in 12 parts of 30 per cent. caustic soda solution and 100 parts of water. After 15 minutes' stirring concentrated hydrochloric acid is added until acid reaction to Congo red is reached. The dyestuff which has separated out is filtered by suction. It is then dissolved in 200 parts of water with addition of 10 parts by volume of 30 per cent. caustic soda solution cooled down and coupled with a diazo solution obtained in known manner from 5.1 parts of para-chloroaniline. The mixture is stirred first at 0–5° C. for 2 hours and then 20 hours allowing the temperature to rise to about 18° C. By addition of common salt the dyestuff which corresponds to the formula

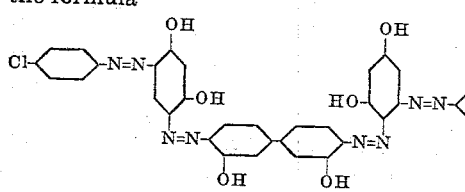

is precipitated. It dyes cotton on after-coppering very fast violet shades.

Example 7

21.6 parts of 3:3'-dihydroxy-4:4'-diamino-diphenyl are dissolved in 500 parts of diluted hydrochloric acid and tetrazotized by addition of 13.8 parts of sodium nitrite previously dissolved in water at 5–10° C. This tetrazo compound is coupled in a solution alkaline with sodium carbonate with 22 parts of resorcinol at 10–15° C. The violet disazo dyestuff thus obtained is separated by addition of common salt and purified by dissolving and precipitating it again.

The purified disazo-dyestuff is dissolved in 800 parts of water and 24 parts of caustic soda solution of 40 per cent. by volume and the solution is cooled to 10° C. The diazoazo-compound obtained in known manner from 36.8 parts of tetrazotized benzidine and 30.4 parts of salicyclic acid is added and coupling is carried out for 24 hours at 10 to 15° C. The hexakisazo-dyestuff of the formula has almost completely separated out. It is filtered off and purified by dissolving and re-precipitating.

When dry the new dyestuff is a greyish black powder dissolving in water with yellow brown, in 10 per cent. soda solution with brown, in 10 per cent. caustic soda solution with reddish brown and in concentrated sulfuric acid with violet color. It dyes cotton on after-coppering in a one or two bath process brown shades of very good fastness.

Example 8

15.4 parts of 5-nitro-2-amino-1-hydroxybenzene are diazotized as usual and coupled with 12 parts of resorcinol in a solution alkaline with sodium carbonate. The monoazo-dyestuff is precipitated by addition of little common salt and purified by dissolving it in water and salting out. Then it is dissolved in 600 parts of water and 12 parts of caustic soda solution of 40 per cent. by volume. After cooling to 10° C. and addition of 10.6 parts of anhydrous sodium carbonate, the solution is coupled with the tetrazo compound from 10.8 parts of 3:3'-dihydroxy-4:4'-diaminodiphenyl prepared in a solution acid with hydrochloric acid by addition of 6.9 parts of sodium nitrite previously dissolved to form a 20 per cent. solution. In the course of the coupling reaction the temperature is gradually raised to 20–30° C. When coupling is complete, the tetrakisazo-dyestuff of the formula

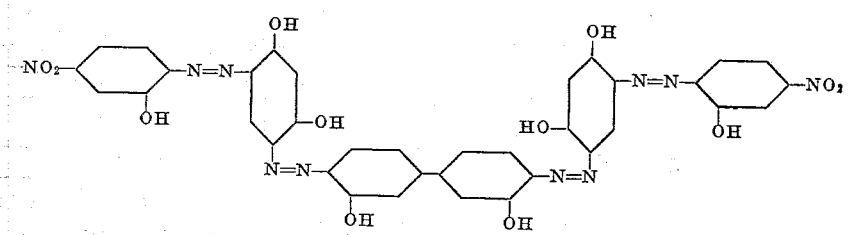

has almost completely separated out and is purified by dissolving in water and salting out.

When dry it is a greyish-black powder which dissolves in water with brownish red, in 10 per cent. soda solution with violet brown and in concentrated sulfuric acid with reddish violet color. It dyes cotton on after-treatment with copper salts brownish violet shades of good fastness.

Example 9

Into a dye-bath containing 2 parts of the dyestuff obtained according to Example 1, third paragraph, 2 parts of soda and 30 parts of crystallized sodium sulfate in 2500 parts of water, are entered 100 parts of cotton at 40° C. The temperature is raised to 80–90° C. and dyeing is effected at this temperature. Then a solution of complex copper tartrate feebly alkaline with sodium carbonate is added and dyeing is continued for ½ hour at 80–90° C. The cotton is

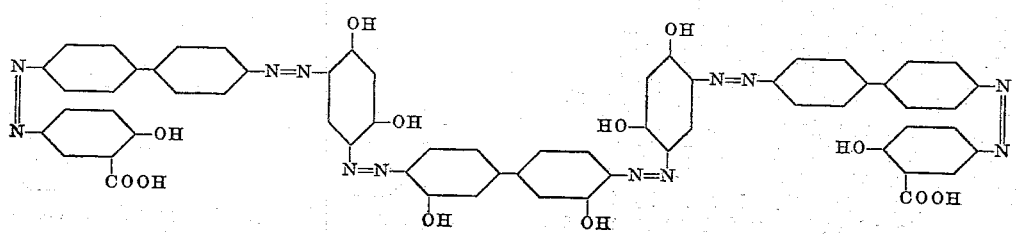

What we claim is:

1. Dyestuffs of the general formula

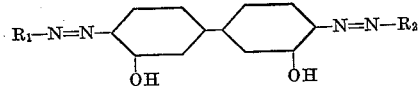

wherein $R_1$ and $R_2$ stand for radicals of coupling components at least one of which contains at least one azo-group.

2. Dyestuffs of the general formula

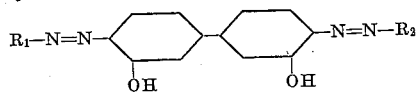

wherein $R_1$ and $R_2$ stand for radicals of coupling components at least one of which is capable of coupling twice and contains at least one azo-group.

3. Dyestuffs of the general formula

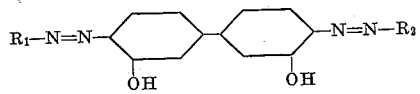

wherein $R_1$ and $R_2$ stand for radicals of the same coupling component capable of coupling twice and containing at least one azo-group.

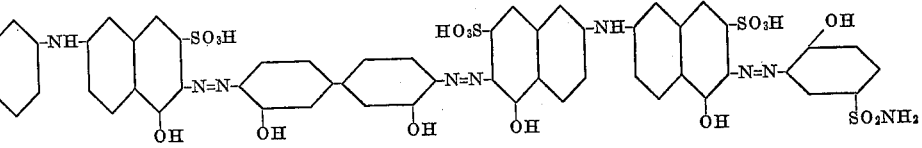

4. Dyestuffs of the general formula

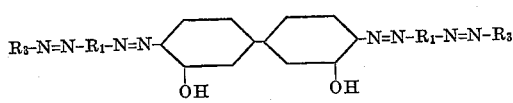

wherein $R_1$ stands for the radical of a coupling component capable of coupling twice and $R_3$ stands for the radical of a diazo-component.

5. Dyestuffs of the general formula

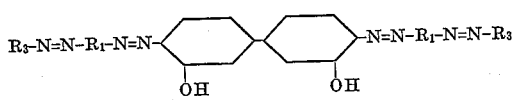

wherein $R_1$ stands for the radical of a coupling component capable of coupling twice and $R_3$ stands for the radical of a diazo-component containing at least one group promoting formation of complex metal compounds.

6. Process for the manufacture of polyazo-dyestuffs, comprising coupling, in a medium alkaline with a member of the group consisting of ammonia and the hydroxides of the alkali and alkaline earth metals, a tetrazotized 3:3'-dihydroxy-4:4'-diaminodiphenyl with two molecular proportions of coupling components capable of coupling twice of the general formula

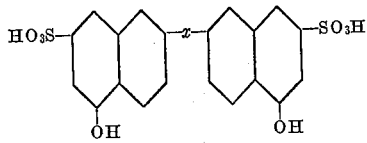

wherein $x$ stands for a nitrogen-containing linkage and coupling the disazo-dyestuff thus obtained with two molecular proportions of a diazo-compound.

7. Process for the manufacture of polyazo-dyestuffs, comprising coupling the disazo-dyestuff from tetrazotized 3:3'-dihydroxy-4:4'-diaminodiphenyl and 2 mols of 5:5'-dihydroxy-2:2'-dinaphthylamine-7:7'-disulfonic acid with two mols of diazotized 1-hydroxy-2-aminobenzene-4-sulfamide.

8. Process for the manufacture of polyazo-dyestuffs, comprising coupling the disazo-dyestuff from tetrazotized 3:3'-dihydroxy-4:4'-diaminodiphenyl and 2 mols of 5:5'-dihydroxy-2:2'-dinaphthylamine-7:7'-disulfonic acid with two mols of diazotized 1-hydroxy-2-amino-5-nitrobenzene.

9. The azo-dyestuff of the formula

10. The azo-dyestuff of the formula

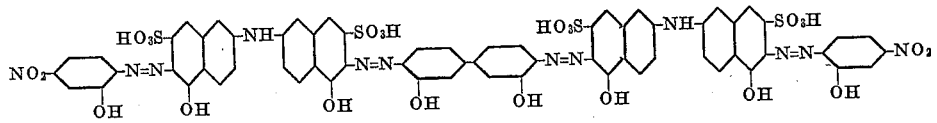

FRITZ STRAUB.
JAKOB BRASSEL.
PETER PIETH.

REFERENCES CITED

The following references are of record in the file of this patent:

UNITED STATES PATENTS

| Number | Name | Date |
|---|---|---|
| 1,210,751 | Anderwert | Jan. 2, 1917 |
| 1,889,732 | Stusser | Nov. 29, 1932 |
| 2,039,898 | Gyr | May 5, 1936 |
| 1,292,385 | Anderwert | Jan. 21, 1919 |
| 2,189,522 | Kopp | Feb. 6, 1940 |
| 519,523 | Brack | May 8, 1894 |
| 2,106,876 | Schubert | Feb. 1, 1938 |
| 842,548 | Herzberg | Jan. 29, 1907 |

FOREIGN PATENTS

| Number | Country | Date |
|---|---|---|
| 577,165 | Germany | May 27, 1933 |
| 52,661 | Germany | June 16, 1888 |